(12) United States Patent
Madej et al.

(10) Patent No.: US 9,489,554 B2
(45) Date of Patent: Nov. 8, 2016

(54) ARRANGEMENT FOR AND METHOD OF ASSESSING EFFICIENCY OF TRANSACTIONS INVOLVING PRODUCTS ASSOCIATED WITH ELECTRO-OPTICALLY READABLE TARGETS

(71) Applicant: SYMBOL TECHNOLOGIES, INC., Lincolnshire, IL (US)

(72) Inventors: Dariusz Madej, Shoreham, NY (US); Kenneth S. Bhella, Stony Brook, NY (US); Christopher J. Fjellstad, Smithtown, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/679,522

(22) Filed: Apr. 6, 2015

(65) Prior Publication Data

US 2016/0292475 A1    Oct. 6, 2016

(51) Int. Cl.
*G06K 5/00* (2006.01)
*G06K 7/10* (2006.01)
*G06F 17/30* (2006.01)

(52) U.S. Cl.
CPC ..... *G06K 7/10722* (2013.01); *G06F 17/30997* (2013.01)

(58) Field of Classification Search
CPC .............. G06K 17/0022; G06K 7/10; G06K 7/10554; G06K 7/1096
USPC ................................ 235/437, 436, 439, 454
See application file for complete search history.

(56) References Cited

U.S. PATENT DOCUMENTS

| | | | |
|---|---|---|---|
| 6,123,261 A | | 9/2000 | Roustaei |
| 8,579,198 B2 * | | 11/2013 | Madej ................ G06K 7/10554 235/454 |
| 8,678,274 B1 * | | 3/2014 | Madej .................. G07G 1/0018 235/379 |
| 2004/0118928 A1 | | 6/2004 | Patel et al. |
| 2005/0274806 A1 | | 12/2005 | Dant |
| 2006/0011724 A1 | | 1/2006 | Joseph et al. |
| 2007/0119941 A1* | | 5/2007 | He ........................... G06K 7/10 235/462.15 |
| 2009/0188981 A1 | | 7/2009 | Iizaka et al. |
| 2011/0049242 A1 | | 3/2011 | Vinogradov et al. |
| 2012/0097745 A1 | | 4/2012 | Brock |
| 2012/0193421 A1* | | 8/2012 | Sauerwein, Jr. ... G06K 7/10722 235/455 |
| 2013/0062413 A1 | | 3/2013 | Nahill et al. |
| 2014/0263644 A1 | | 9/2014 | Handshaw et al. |

OTHER PUBLICATIONS

International Search Report and Written Opinion mailed Jun. 6, 2016 in counterpart PCT application PCT/US2016/023758.

* cited by examiner

*Primary Examiner* — Seung Lee (57) ABSTRACT

A reader electro-optically reads symbols associated with products to obtain read data, and a controller decodes the read data to obtain symbol data indicative of the associated products. Reading performance is assessed by collecting time-to-decode metadata by determining each decode time period that is taken for each symbol data to be successfully decoded, by associating the collected time-to-decode metadata with the symbol data, by comparing the collected time-to-decode metadata with a predetermined long amount of decode time that is indicative of a slow reading performance, by storing each decode time period that at least equals said predetermined long amount of decode time, and by storing the symbol data associated with each stored decode time period.

19 Claims, 4 Drawing Sheets

ARRANGEMENT FOR AND METHOD OF ASSESSING EFFICIENCY OF TRANSACTIONS INVOLVING PRODUCTS ASSOCIATED WITH ELECTRO-OPTICALLY READABLE TARGETS

BACKGROUND OF THE INVENTION

The present disclosure relates generally to an arrangement for, and a method of, assessing efficiency of transactions involving products that are associated with targets, such as symbols, to be electro-optically decoded and read, and, more particularly, to assessing reading performance by collecting and comparing time-to-decode metadata with a predetermined long amount of decode time indicative of a slow, sluggish reading performance.

Handheld readers and hands-free readers, such as flat bed or horizontal slot readers, vertical slot readers, and bi-optical readers, have all been used to electro-optically read targets, such as one-dimensional bar code symbols, particularly of the Universal Product Code (UPC) type, and two-dimensional bar code symbols, such as PDF417 and QR codes, in many different venues, such as at full-service or self-service, point-of-transaction, retail checkout systems operated by checkout clerks or customers, and located at supermarkets, warehouse clubs, department stores, and other kinds of retailers, as well as at many other types of businesses, for many years. Handheld readers are typically held in a user's hand and aimed at products bearing, or associated with, identifying target symbols. For hands-free readers having a scan window, such products with their target symbols are typically slid by a user across the scan window in a "swipe" mode, or the user merely presents the target symbols momentarily steady at the scan window in a "presentation" mode. The choice depends on the type of target, on user preference, and on the layout of the system.

Some readers are laser-based, and project a multitude of laser scan lines through the scan window. When at least one of the scan lines sweeps over a symbol associated with a product, the symbol is processed, decoded and read by a programmed microprocessor or controller, thereby generating symbol data identifying the product and enabling information, such as the product's price, to be retrieved from a price database. The multitude of scan lines is typically generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the scan window as a scan pattern of the laser scan lines.

Other readers are imager-based, and have one or more solid-state imagers, or image sensors, analogous to those conventionally used in consumer digital cameras. Each imager has a one- or two-dimensional array of photocells or light sensors (also known as pixels), and an imaging lens assembly for capturing return light scattered and/or reflected from a target being imaged through a scan window over a field of view, and for projecting the return light onto the sensor array to initiate capture of an image of the target over a range of working distances in which the target can be read. The target may be a symbol, as described above, either printed on a label or displayed on a display screen of an electronic device, such as a smart phone. The target may also be a form, such as a document, label, receipt, signature, driver's license, employee badge, or payment/loyalty card, etc., each bearing alphanumeric characters, as well as a picture, to be imaged. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into target data related to the target being electro-optically read, e.g., decoded data identifying the product, and enabling information, such as the product's price, to be retrieved from a price database, or into a picture of a target other than a symbol.

The above-described laser-based or imager-based readers, employed in either handheld and/or hands-free modes of operation, typically decode and read a symbol in an optimum decode time, e.g., less than about 200 milliseconds (ms), and this is generally considered to be responsive, aggressive, and satisfactory in most applications. Upon a successful decode, the controller typically energizes an auditory annunciator, e.g., a beeper, and/or a visual indicator, such as a light, to alert the user that the target has been successfully decoded. There are times, however, when such decode times are not routinely realized. For example, a symbol may be poorly printed, or covered up with extraneous markings or dirt. Or, a label bearing the symbol may be torn, or overlain with a transparent plastic film or dirt, or placed incorrectly on its product. Alternatively, sunlight or ambient bright lights may cause specular reflections or bright spots to appear on the symbol. The scan window itself may be dirty or scratched, which may interfere with a quick, responsive reading. An inexperienced user may be performing an incorrect scanning technique, thereby delaying reading. All of these factors, and more, either singly or in combination, can deleteriously impair reading performance and can slow down the decode time to exceed the optimum decode time of about 200 ms, and, in some cases, to exceed about 3 seconds, thereby causing the reader to time out without having read the symbol. Such a slow, sluggish performance is unacceptable, particularly in the retail industry, where retailers value fast checkout transactions, and where getting a customer checked out faster generally results in higher revenues.

At present, some retailers try to discover any symbols that read poorly (slowly) by instructing their clerks to take note of each such sluggish performance. Typically, this is done by manually collecting a second physical specimen of the product with the symbol that scanned slowly, because the first physical specimen of the product has already been purchased and removed from the retailer's premises by the customer. In this way, the retailers can inspect the second physical specimen and possibly determine, for example, the source of the slow decode time and possibly see if there is any consistent pattern to the poor performance. However, this technique is ineffective in practice. A clerk may either conveniently or inadvertently forget the retailer's instructions, or simply not wish to be bothered to retrieve a second physical specimen. Not every clerk will have the same mental determination as to what amount of decode time is slow or fast. Due to the subjective, labor-intensive, and extra cost and effort associated with this technique, most retailers do not optimize their checkout times at all, or not as regularly or frequently as they would like.

Accordingly, there is a need to assess reading performance in an automatic, accurate, and inexpensive manner, and to readily determine the source of poor (slow) reading performance so that corrective measures can be quickly implemented.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and arrangement components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for assessing efficiency of transactions involving products that are associated with targets, e.g., bar code symbols, to be electro-optically read. The arrangement includes a reader, e.g., either handheld and/or hands-free, either laser-based or imager-based, for electro-optically reading the targets to obtain read data, and a controller, e.g., a programmed microprocessor, for processing the read data to generate target data indicative of the associated products. The controller is also operative for collecting metadata, i.e., auxiliary data descriptive of the target data. The metadata is also descriptive of the efficiency of the transactions. The controller associates the collected metadata with the target data, compares the collected metadata with an inefficiency threshold that is indicative of an inefficient transaction, and stores the collected metadata that at least equals, and preferably exceeds, the inefficiency threshold, and stores the target data associated with the stored metadata.

Preferably, the controller generates the target data by decoding the read data, and collects the metadata by determining each decode time period that is taken for each target data to be successfully decoded. The inefficiency threshold is a predetermined long amount of decode time that is indicative of a slow, sluggish reading performance. The controller stores each decode time period that at least equals, and preferably exceeds, said predetermined long amount of decode time, and stores the target data associated with each stored decode time period.

Another aspect of this disclosure relates to an arrangement for assessing reading performance during reading of coded symbols associated with products. The arrangement includes a reader, as described above, and a controller for decoding the read data to obtain symbol data indicative of the associated products. The controller is also operative for collecting time-to-decode metadata by determining each decode time period that is taken for each symbol data to be successfully decoded, for associating the collected time-to-decode metadata with the symbol data, for comparing the collected time-to-decode metadata with a predetermined long amount of decode time that is indicative of a slow reading performance, for storing each decode time period that at least equals, and preferably exceeds, said predetermined long amount of decode time, and for storing the symbol data associated with each stored decode time period.

A method of assessing efficiency of transactions involving products that are associated with targets to be electro-optically read, in accordance with another aspect of this disclosure, is performed by electro-optically reading the targets to obtain read data, processing the read data to generate target data indicative of the associated products, collecting metadata descriptive of the efficiency of the transactions, associating the collected metadata with the target data, comparing the collected metadata with an inefficiency threshold that is indicative of an inefficient transaction, storing the collected metadata that at least equals, and preferably exceeds, the inefficiency threshold, and storing the target data associated with the stored metadata.

Figure 1:
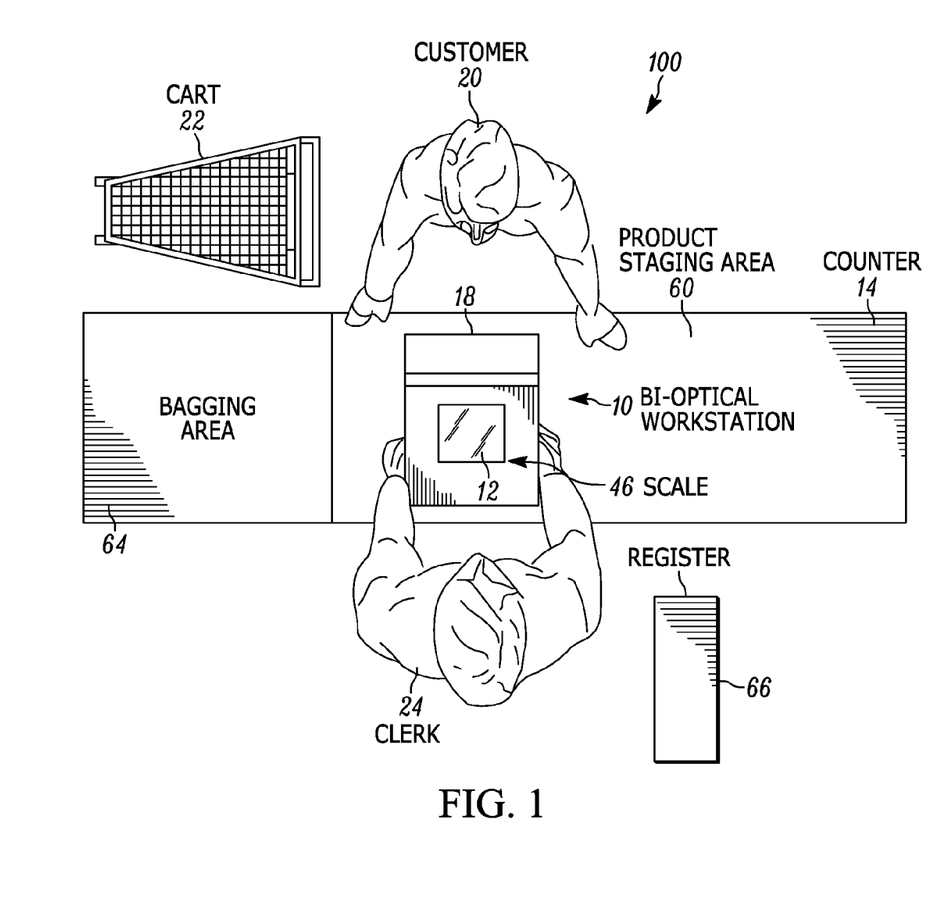
FIG. 1 is a top plan view of a retail checkout system in which reading performance is assessed in accordance with this disclosure.
Figure 2:
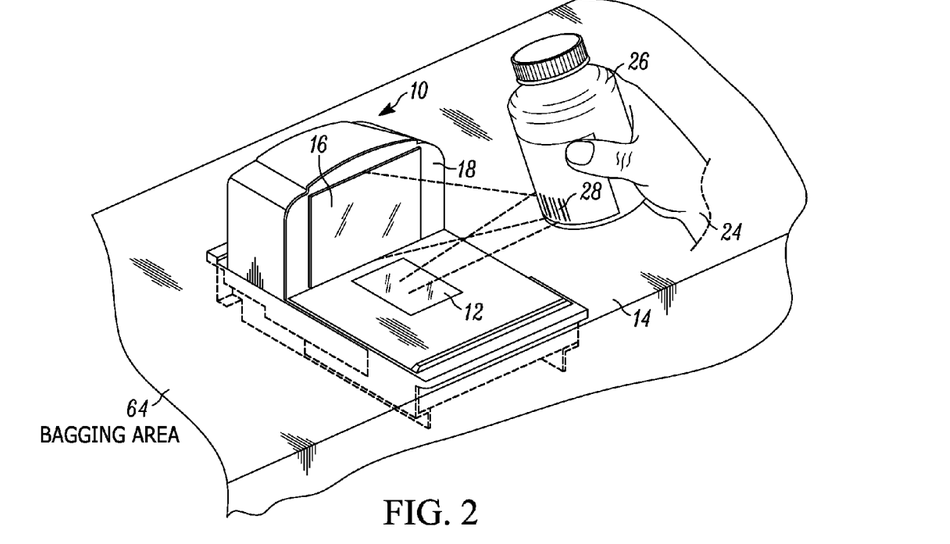
FIG. 2 is a broken-away perspective view of the system of FIG. 1 during reading.
Figure 3:
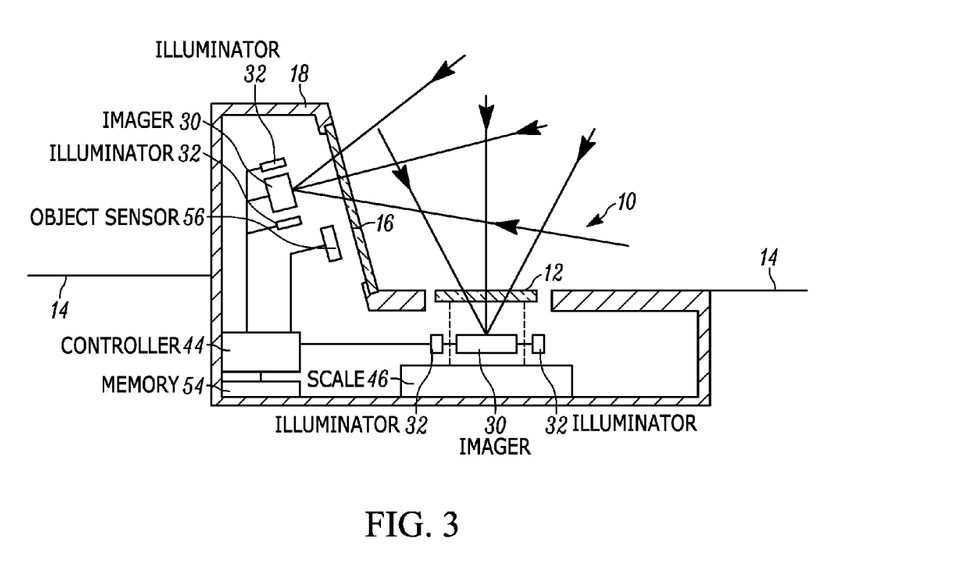
FIG. 3 is a schematic diagram of various components of the system of FIG. 1.

Turning now to the drawings, a retail checkout system 100, as depicted in FIG. 1, includes a reader and, as shown, a dual window, bi-optical, point-of-transaction workstation 10 used by retailers at a checkout counter in an aisle to process transactions involving the purchase of products 26 (see FIG. 2) bearing an identifying target, such as the UPC symbol 28 described above. In a typical retail venue, a plurality of such workstations 10 is arranged in a plurality of checkout aisles. As best seen in FIGS. 2-3, the workstation 10 has a generally horizontal planar window 12 elevated, or set flush with, a countertop 14, and a vertical or generally vertical, i.e., tilted, (referred to as "upright" hereinafter) planar window 16 set flush with, or recessed into, a raised housing portion 18 above the countertop 14. The workstation 10 either rests directly on the countertop 14, or preferably, as shown in FIGS. 2-3, rests in a cutout or well formed in the counter.

Both of the windows 12, 16 are positioned to face and be accessible to a clerk 24 (FIG. 1) standing at one side of the counter for enabling the clerk 24 to interact with the workstation 10, and with a cash register 66 to enable the clerk to receive payment for the purchased products. The register 66 may include a debit/credit card reader and a receipt printer to print a receipt. The workstation 10 and/or the register 66 is in wired or wireless communication with a host server 70, as described below in connection with FIG. 4. A keypad may also be provided at the register 66 to enable manual entry of information, such as an identifying code for any purchased product not bearing a symbol, by the clerk 24.

A product staging area 60 is located on the countertop 14 at one side of the workstation 10. The products 26 are typically placed on the product staging area 60 by a customer 20 standing at the opposite side of the counter. The customer 20 typically retrieves the individual products for purchase from a shopping cart 22 or basket for placement on the product staging area 60. A non-illustrated conveyor belt could be employed for conveying the products 26 to the clerk 24.

As schematically shown in FIG. 3, a data capture arrangement, advantageously including a plurality of imaging readers, each including a solid-state imager 30 and an illuminator 32, is mounted at the workstation 10, for capturing light passing through either or both windows 12, 16 from a target that can be a one- or two-dimensional symbol. Each imager 30 is a solid-state area array, preferably a CCD or CMOS array. Each imager 30 preferably has a global shutter. Each illuminator 32 is preferably one or more light sources, e.g., one or more surface-mounted, light emitting diodes (LEDs), located at each imager 30 to uniformly illuminate the target.

In use, the clerk 24 processes each product 26 bearing a UPC symbol or target 28 thereon, past the windows 12, 16 by swiping the product 26 across a respective window, or by presenting the product 26 by holding it momentarily steady at the respective window, before passing the product 26 to a bagging area 64 that is located at the opposite side of the workstation 10. The target 28 may be located on any of the top, bottom, right, left, front and rear, sides of the product, and at least one, if not more, of the imagers 30 will capture the illumination light reflected, scattered, or otherwise returning from the target through one or both windows as an image.

FIG. 3 also schematically depicts that a weighing scale 46 can be mounted at the workstation 10. Also, an object sensor 56 is mounted at the workstation 10 for detecting when each product 26 enters the workstation 10. The object sensor 56 may advantageously include at least one pair of an infrared (IR) light emitting diode (LED) emitter and an IR detector. The imagers 30, the associated illuminators 32, and the object sensor 56 are operatively connected to a programmed workstation microprocessor or controller 44 operative for controlling the operation of these and other components. Preferably, the controller 44 is tasked with processing the return light scattered from each target 28, and with decoding the captured target image of the return light to generate target data. A memory 54 is operatively bidirectionally connected to the controller 44.

In operation, an active mode for the controller 44 is initiated when the object sensor 56 detects that a product 26 has entered the workstation 10. The controller 44 then sends successive command signals to the illuminators 32 to pulse the LEDs for a short time period of about 200 microseconds or less, and successively energizes the imagers 30 to collect light from the target 28 only during said time period, also known as the exposure time period. By acquiring a target image during this brief time period, the image of the target 28 is not excessively blurred even in the presence of relative motion between the imagers and the target. A typical array needs about 11 to 33 milliseconds to acquire the entire target image and operates at a frame rate of about 30 to 90 frames per second. The array may have on the order of one million addressable sensors. The active mode ends when the object sensor 56 detects that the product 26 has exited the workstation 10, or when the controller 44 has successfully decoded the target 28 and identified the product 26. Upon a successful decode, the controller 44 typically energizes an auditory annunciator, e.g., a beeper, and/or a visual indicator, such as a light, to alert the clerk 24 that the target 28 has been successfully decoded.

Although an imager-based bi-optical workstation 10 has been illustrated in FIGS. 1-3, it will be expressly understood that the present disclosure is not intended to be so limited, because the bi-optical workstation 10 could also be laser-based, as described above. In addition, other types of hands-free readers could be employed. For example, a flat bed or horizontal slot reader having a single horizontal window, or a vertical slot reader having a single vertical window, could be employed instead of the bi-optical workstation 10. Also, trigger-operated handheld readers, typically gun-shaped in configuration, could replace the illustrated workstation 10.

Thus, no matter which type of reader is employed, the controller 44 not only decodes and generates the symbol data indicative of the associated products 26 involved in the transactions occurring at the reader, as described above, but is additionally tasked with collecting metadata descriptive of the efficiency of the transactions. This metadata is additional or auxiliary data descriptive of the target data. As described below, this metadata may represent different aspects or factors in the reading performance. In a preferred embodiment, this metadata is "time-to-decode" metadata and represents the duration of each decode time period that is taken for each symbol data to be successfully decoded.

The controller 44 associates the collected metadata with the symbol data, compares the collected metadata with an inefficiency threshold that is indicative of an inefficient transaction, stores the collected metadata that at least equals, and preferably exceeds, the inefficiency threshold, and also stores the associated symbol data. In the preferred embodiment in which time-to-decode metadata is collected substantially simultaneously with the generation of the symbol data, the controller 44 determines each decode time period by determining a start time when reading is initiated, and an end time when reading is completed upon a successful decode. The difference between the end and the start times is a measure of the decode time. In the case of the hands-free workstation 10, the start time begins when the object sensor 56 detects entry of the product 26 into the workstation. In the case of the handheld reader, the start time begins when its trigger is manually actuated or depressed. In either case, the end time is determined when the controller 44 generates a successful decode signal to energize the aforementioned annunciator/light.

The inefficiency threshold is a predetermined long amount of decode time that is indicative of a slow, sluggish reading performance. An optimum decode time, e.g., less than about 200 ms is generally considered to be responsive, aggressive, and satisfactory in most applications. A decode time greater than about 200 ms is generally considered to be slow. As mentioned above, such lengthy decode times are typically realized when a symbol 28 is poorly printed, or covered up with extraneous markings or dirt, or when a label bearing the symbol 28 is torn, or overlain with a transparent plastic film or dirt, or placed incorrectly on its product 26. Alternatively, sunlight or ambient bright lights may cause specular reflections or bright spots to appear on the symbol 28, or the scan window 12, 16 may be dirty or scratched, all of which may interfere with a quick, responsive reading. An inexperienced user 24 may be performing an incorrect scanning technique, thereby delaying reading. All of these factors, and more, either singly or in combination, can deleteriously impair reading performance and can slow down the decode time to exceed the optimum decode time of about 200 ms, and, in some cases, to exceed about 3 seconds, thereby causing the reader to time out without having read the symbol.

As noted above, one aspect of this disclosure is to assess when and where such poor, slow reading performance has occurred in an automatic, accurate, and inexpensive manner, so that corrective measures can be quickly implemented. To that end, the controller 44 automatically stores in the memory 54 each decode time period that at least equals, and preferably exceeds, said predetermined long amount of decode time. Thus, only the slowest (worst) decode time periods are stored and, in addition, the controller 44 automatically stores in the memory 54 the target data associated with these slowest (worst) decode time periods.

Put another way, the memory 54 stores the slowest decode time periods and the identities of the symbols (products) that caused these slowest decode time periods. The memory 54 could store any arbitrary number N of the slowest decode time periods and the identities of the symbols (products), or can store how many repetitions of each poorly readable symbol (product) have been collected. The memory 54 can be queried by the host server 70 (FIG. 4) and can be displayed on a monitor screen 72. A retailer can then refer to the displayed query results as often as desired, e.g., daily, to determine which symbols (products) are the worst and the most offenders in slowing down the checkout process.

Figure 4:
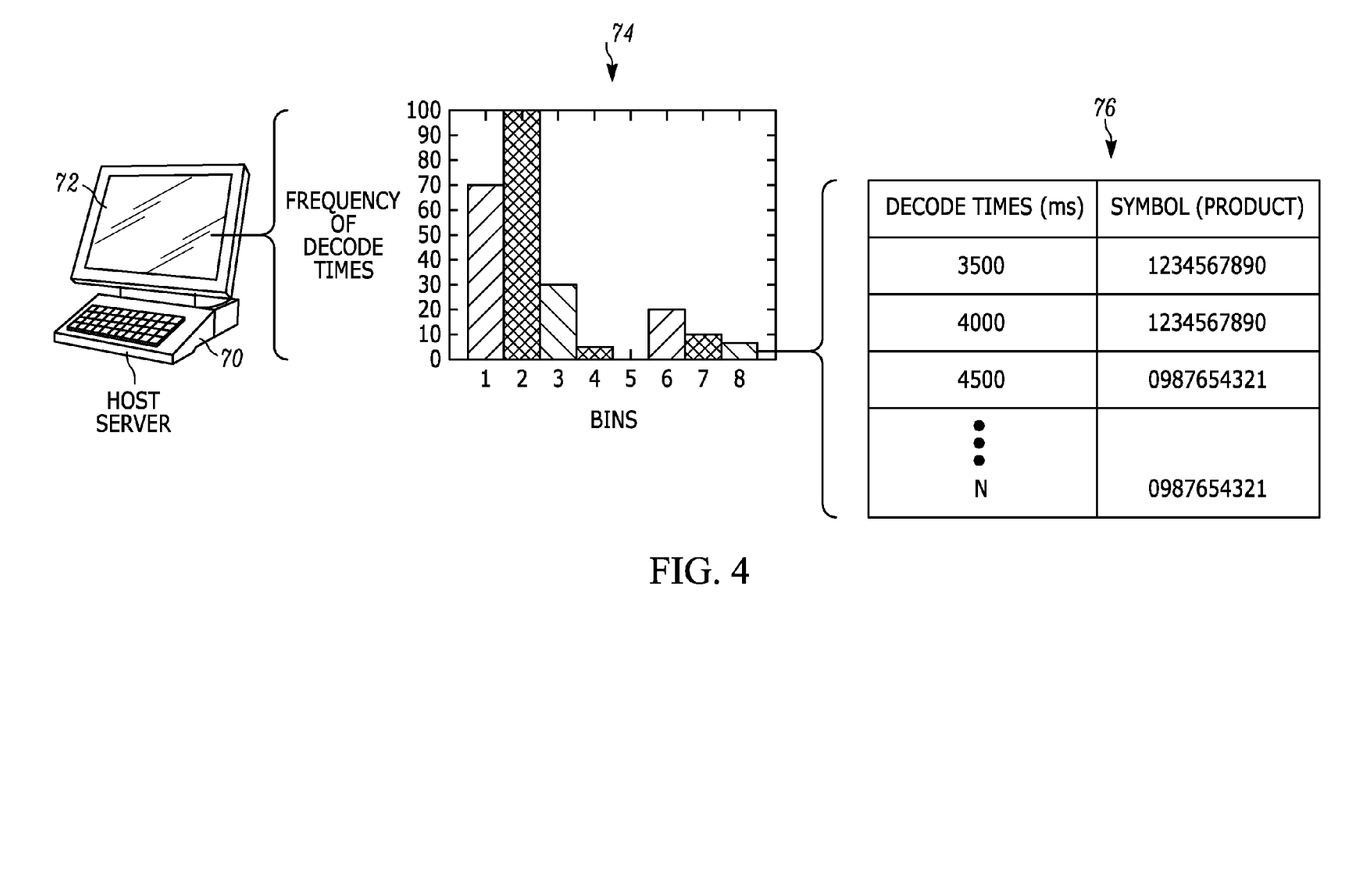
FIG. 4 is a diagrammatic view of a host server querying the system and displaying the results in a histogram format.

In a preferred embodiment, the time-to-decode metadata is collected in the form of a histogram 74 (FIG. 4). Thus, instead of storing actual measured decode time periods, the time-to-decode metadata is classified into categories or bins that correspond to a human perception or interpretation of elapsed time, and then the frequency of the occurrences of the decode time periods is plotted. An example of one such histogram classification is given in the table below:

| Bin Number | Decode Time Period (ms) | Human Perception |
| --- | --- | --- |
| 1 | 0-50 | Very Fast |
| 2 | 51-100 | Fast |
| 3 | 101-200 | Medium-Fast |
| 4 | 201-400 | Sluggish |
| 5 | 401-800 | Slow |
| 6 | 801-1600 | Very Slow |
| 7 | 1600-3200 | Extremely Slow |
| 8 | 3201-timeout | Extremely Hard To Read |

A typical histogram 74 in a real-world situation is plotted in FIG. 4, in which the bins are arranged horizontally, and the frequency of the occurrences of the decode time periods is arranged vertically. An ideal histogram would be unimodal with the distribution of all of its decode time periods skewed to the left, thereby indicating that most of the symbols have fast, optimum reading times. However, real-world histogram 74 is bi-modal. Most of the decode time periods are skewed to the left and roughly clustered around bin 2, thereby indicating that most of the symbols have fast, optimum reading times. However, the remaining decode time periods are skewed to the right and roughly clustered around bin 7, thereby indicating that these symbols have slow, sluggish reading times. All the histogram values are scaled so that the maximum frequency is 100, while the other values are scaled proportionately.

As previously mentioned, and as diagrammatically illustrated in FIG. 4 by the chart 76, the controller 44 stores in the memory 54 the slowest decode time periods, e.g., those in bin 8, as well as the identities of the symbols (products) that caused these slowest decode time periods. The memory 54 could store any arbitrary number N of the slowest decode time periods and the identities of the symbols (products). The memory 54 need not store only those decode time periods in bin 8, but, if storage space permits, can store the decode time periods in a plurality of bins, e.g., bins 6-8.

The organization offered by the histogram 74 allows for a very comprehensive and compact storage of the metadata in the memory 54. Although the metadata can be collected and classified in a single histogram for all symbologies, it is preferred if each symbology has its own histogram. For example, two-dimensional codes roughly need twice as much decode time than one-dimensional codes. Thus, the one-dimensional UPC family (UPCA, UPCE, EAN8, EAN13, Supplementals, etc.), all other one-dimensional, linear code families (C39, C128, ITF, etc.), the DataBar family, the PDF/uPDF family, and the two-dimensional matrix family (QR, Data Matrix, Aztec, etc.) would each be recognized and classified by the controller 44 and be provided with their own individual histograms. A current histogram 74 can be compared to a reference histogram either stored in advance, or developed over a series of reading sessions. How the histogram 74 changes over time is another factor in assessing reader performance.

As previously noted, the metadata collected need not be time-to-decode metadata, but could be other types of metadata or information. For example, in a bi-optical reader, the metadata could be which scan window was used to read the symbol, or, if there are multiple fields of view, which field of view was used to read the symbol. A consistently slow reading performance associated with one window might indicate that it was scratched or dirty, or that the window was in direct sunlight or other bright ambient light. A consistently slow reading performance associated with one field of view might indicate that a particular imager was faulty. A consistently slow reading performance associated with one or both windows might indicate that the clerk is using the wrong scanning technique, and that the clerk needed to be trained. The metadata could also identify which reader was being used. A consistently slow reading performance associated with a particular reader could indicate that its clerk needed to be trained, or that the reader itself was malfunctioning. Different histograms created from data from different readers could also be analyzed.

Figure 5:
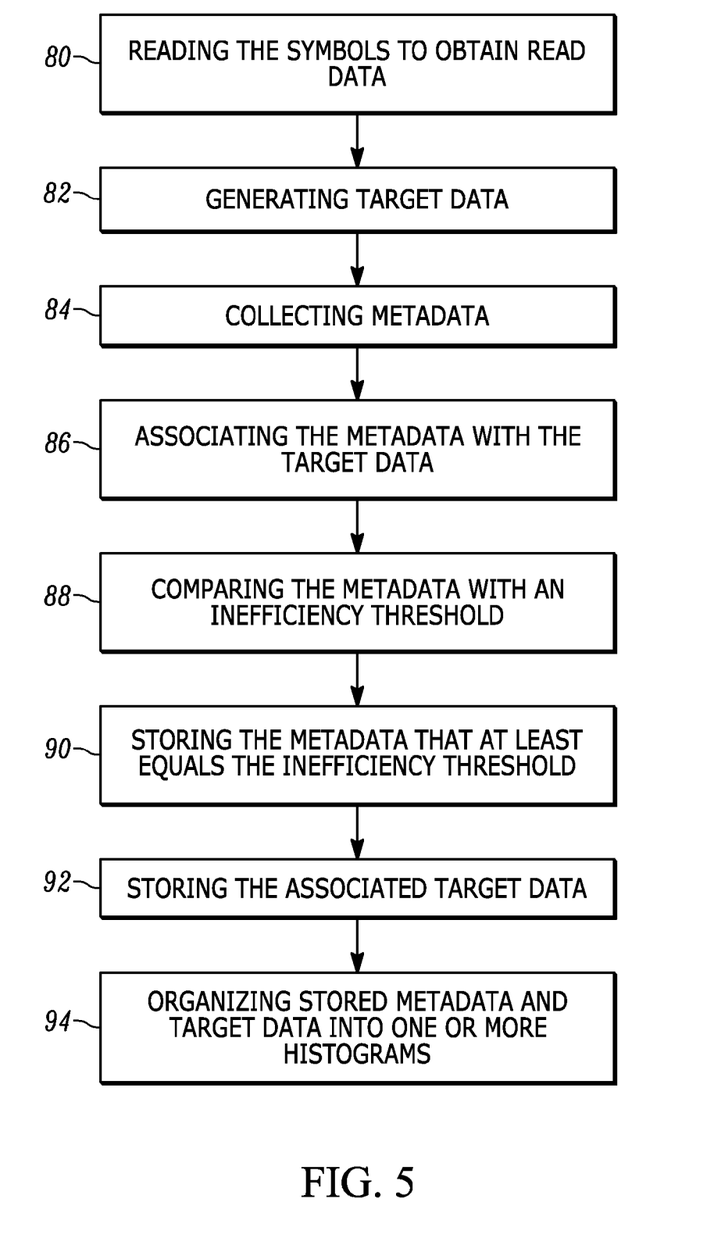
FIG. 5 is a flow chart depicting the steps performed in assessing reading performance in accordance with this disclosure.

As shown in the flow chart of FIG. 5, the method of assessing efficiency of transactions involving products 26 that are associated with symbols 28 to be electro-optically read, is performed by electro-optically reading the symbols 28 to obtain read data (step 80), processing the read data to generate target data indicative of the associated products 26 (step 82), collecting metadata descriptive of the efficiency of the transactions (step 84), associating the collected metadata with the target data (step 86), comparing the collected metadata with an inefficiency threshold that is indicative of an inefficient transaction (step 88), storing the collected metadata that at least equals the inefficiency threshold (step 90), storing the associated target data (step 92), and organizing and displaying the stored metadata and the target data into one or more histograms in response to a user query (step 94).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for assessing efficiency of transactions involving products that are associated with targets to be electro-optically read, comprising:
   a reader for electro-optically reading the targets to obtain read data;
   a controller for processing the read data to generate target data indicative of the associated products, for collecting metadata descriptive of the efficiency of the transactions, for associating the collected metadata with the target data, for comparing the collected metadata with an inefficiency threshold that is a predetermined long amount of decode time that is indicative of a slow reading performance, for storing the collected metadata that at least equals the inefficiency threshold, and for storing the target data associated with the stored metadata; and
   wherein the controller generates the target data by decoding the read data, and wherein the controller collects the metadata by determining each decode time period that is taken for each target data to be successfully decoded, and wherein the controller stores each decode time period that at least equals said predetermined long amount of decode time.

2. The arrangement of claim 1, wherein the controller determines each decode time period by determining a start time when reading is initiated, and an end time when reading is completed upon a successful decode.

3. The arrangement of claim 1, wherein the controller is operative for storing the target data associated with each stored decode time period that at least equals said predetermined long amount of decode time, and for identifying the products associated with the stored target data.

4. The arrangement of claim 1, wherein the reader reads the targets through at least one window over at least one field of view, and wherein the metadata identifies at least one of the window and the field of view.

5. The arrangement of claim 1, wherein the controller is operative for causing the collected metadata to be displayed as a histogram in which a frequency distribution of the decode time periods is plotted in different time intervals.

6. The arrangement of claim 1, wherein the controller is operative for recognizing and classifying the targets into different symbologies, and for causing the collected metadata to be displayed as different histograms, one for each symbology, each histogram being a frequency distribution of the decode time periods plotted in different time intervals.

7. The arrangement of claim 1, and a host server for querying the reader to retrieve the stored target data and the stored metadata.

8. An arrangement for assessing reading performance during reading of coded symbols associated with products, comprising:

a reader for electro-optically reading the symbols to obtain read data; and a controller for decoding the read data to obtain symbol data indicative of the associated products, for collecting time-to-decode metadata by determining each decode time period that is taken for each symbol data to be successfully decoded, for associating the collected time-to-decode metadata with the symbol data, for comparing the collected time-to-decode metadata with a predetermined long amount of decode time that is indicative of a slow reading performance, for storing each decode time period that at least equals said predetermined long amount of decode time, and for storing the symbol data associated with each stored decode time period.

9. The arrangement of claim 8, wherein the controller determines each decode time period by determining a start time when reading is initiated, and an end time when reading is completed upon a successful decode.

10. The arrangement of claim 8, wherein the controller is operative for causing the collected time-to-decode metadata to be displayed as a histogram in which a frequency distribution of the decode time periods is plotted in different time intervals.

11. The arrangement of claim 8, wherein the controller is operative for recognizing and classifying the symbols into different symbologies, and for causing the collected time-to-decode metadata to be displayed as different histograms, one for each symbology, each histogram being a frequency distribution of the decode time periods plotted in different time intervals.

12. The arrangement of claim 8, and a host server for querying the reader to retrieve the stored symbol data and each stored decode time period.

13. A method of assessing efficiency of transactions involving products that are associated with targets to be electro-optically read, comprising:

electro-optically reading the targets to obtain read data;

processing the read data to generate target data indicative of the associated products;

collecting metadata descriptive of the efficiency of the transactions;

associating the collected metadata with the target data;

comparing the collected metadata with an inefficiency threshold that is a predetermined long amount of decode time that is indicative of a slow reading performance;

storing the collected metadata that at least equals the inefficiency threshold; and storing the target data associated with the stored metadata.

14. The method of claim 13, wherein the processing is performed by decoding the read data, and wherein the collecting is performed by determining each decode time period that is taken for each target data to be successfully decoded, and wherein the storing is performed by storing each decode time period that at least equals said predetermined long amount of decode time.

15. The method of claim 14, wherein the determining is performed by determining a start time when reading is initiated, and an end time when reading is completed upon a successful decode.

16. The method of claim 14, and storing the target data associated with each stored decode time period that at least equals said predetermined long amount of decode time, and identifying the products associated with the stored target data.

17. The method of claim 14, and causing the collected metadata to be displayed as a histogram in which a frequency distribution of the decode time periods is plotted in different time intervals.

18. The method of claim 14, and recognizing and classifying the targets into different symbologies, and causing the collected metadata to be displayed as different histograms, one for each symbology, each histogram being a frequency distribution of the decode time periods plotted in different time intervals.

19. The method of claim 13, wherein the reading is performed through at least one window over at least one field of view, and configuring the metadata to identify at least one of the window and the field of view.

* * * * *